(12) United States Patent
Taylor, III

(10) Patent No.: US 12,551,759 B2
(45) Date of Patent: Feb. 17, 2026

(54) SYSTEMS AND METHODS FOR MONITORING ATHLETIC PERFORMANCE

(71) Applicant: Samuel I. Taylor, III, Elk Grove, CA (US)

(72) Inventor: Samuel I. Taylor, III, Elk Grove, CA (US)

(*) Notice: Subject to any disclaimer, the term of this patent is extended or adjusted under 35 U.S.C. 154(b) by 320 days.

(21) Appl. No.: 18/350,633

(22) Filed: Jul. 11, 2023

(65) Prior Publication Data
US 2024/0009516 A1   Jan. 11, 2024

Related U.S. Application Data

(60) Provisional application No. 63/368,103, filed on Jul. 11, 2022.

(51) Int. Cl.
| | | |
|---|---|---|
| A63B 24/00 | (2006.01) | |
| A61B 5/00 | (2006.01) | |
| A61B 5/0205 | (2006.01) | |
| A61B 5/11 | (2006.01) | |
| A61B 5/318 | (2021.01) | |
| A61B 5/389 | (2021.01) | |
| A61B 5/024 | (2006.01) | |

(52) U.S. Cl.
CPC ........ *A63B 24/0062* (2013.01); *A61B 5/0205* (2013.01); *A61B 5/1107* (2013.01); *A61B 5/318* (2021.01); *A61B 5/389* (2021.01); *A61B 5/6804* (2013.01); *A61B 5/02438* (2013.01)

(58) Field of Classification Search
CPC ..... A63B 24/0062; A61B 5/318; A61B 5/389; A61B 5/0205; A61B 5/1107; A61B 5/6804; A61B 5/02438
USPC .......................................................... 700/91
See application file for complete search history.

(56) References Cited

U.S. PATENT DOCUMENTS

| | | | | |
|---|---|---|---|---|
| 11,246,531 | B2* | 2/2022 | Korzinov | A61B 5/0006 |
| 2015/0366504 | A1* | 12/2015 | Connor | A61B 5/6804 600/301 |
| 2016/0180059 | A1* | 6/2016 | Kuo | G06V 40/23 434/247 |
| 2019/0344121 | A1* | 11/2019 | Wells | A61B 5/6805 |
| 2023/0031291 | A1* | 2/2023 | Nakamura | A63B 24/0087 |
| 2023/0157605 | A1* | 5/2023 | Mrvaljevic | A61B 5/024 600/546 |

* cited by examiner

*Primary Examiner* — Allen Chan
(74) *Attorney, Agent, or Firm* — Stoel Rives LLP

(57) ABSTRACT

Systems and methods for monitoring sport-specific athletic performance are disclosed. An exemplary system includes: a garment; a plurality of sensors attached to the garment at a plurality of locations corresponding to a plurality of parts of a body; a communication device in proximity of the garment; and a computing device including a memory device and one or more processors. The plurality of sensors provide sensor data responsive to physical activities of the corresponding plurality of parts of the body. The communication device collects the data from the plurality of sensors and provides the data. The one or more processors causes the memory device to store the sensor data from the communication device, processes the sensor data based on a plurality of locations of the sensors, analyze performance of muscle contraction based on the processed data; and causes a display to present the result of the athletic performance to the user.

20 Claims, 8 Drawing Sheets

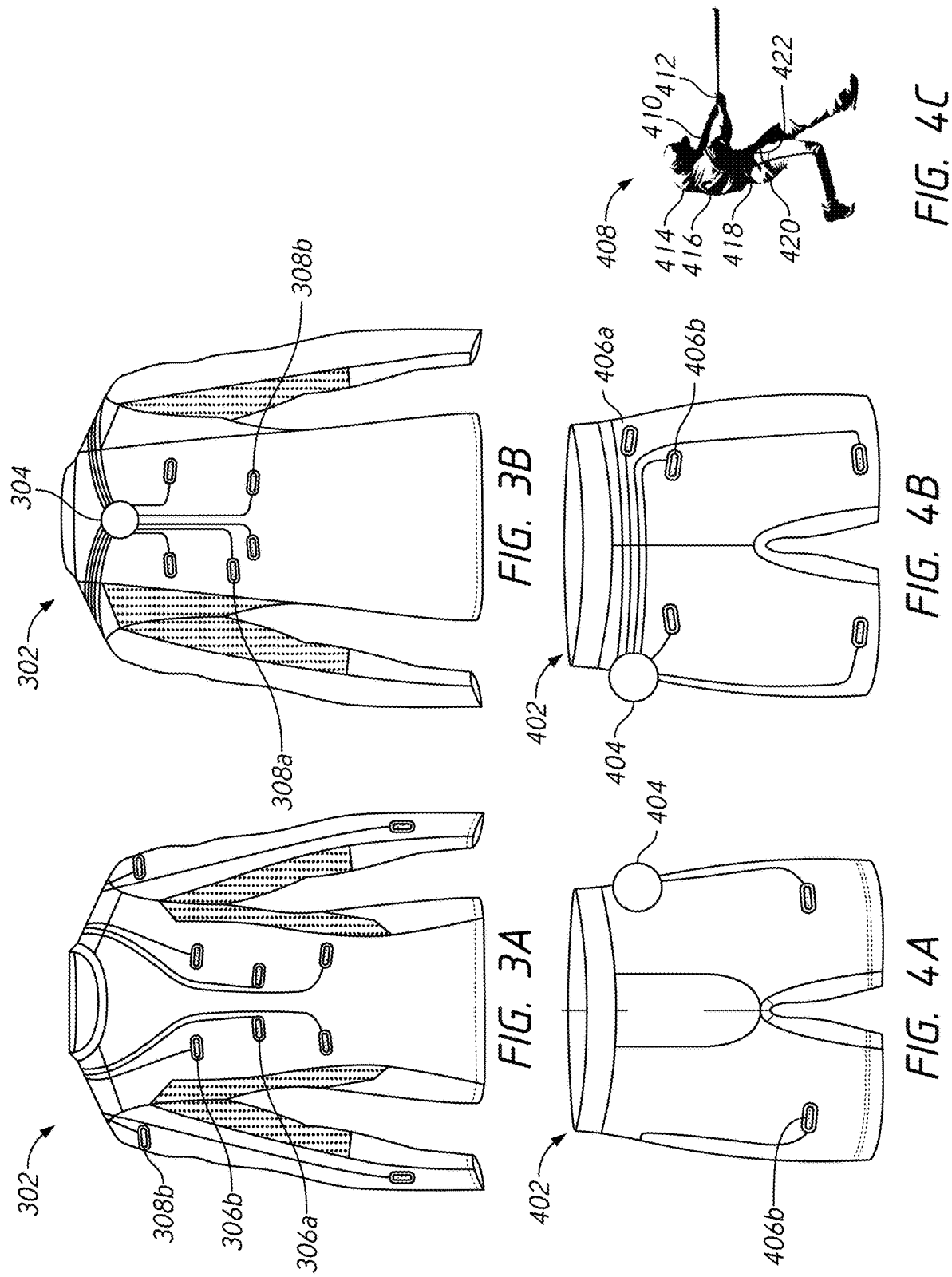

SYSTEMS AND METHODS FOR MONITORING ATHLETIC PERFORMANCE

PRIORITY

This application claims priority to U.S. Provisional Application 63/368,103, filed Jul. 11, 2022, which application is hereby incorporated by reference, in its entirety, for any purpose.

TECHNICAL FIELD

This application generally relates to physiological data and performance monitoring, and more particularly to systems for sensing, processing, and displaying biometric data. The present application relates generally to computer software, mobile electronics, wireless communication links, and wearable monitoring systems. More specifically, techniques, fabrics, materials, systems, sensors, such as electromyogram (EMG) sensors, circuitry, algorithms, and methods for wearable monitoring devices and associated performance regimens are described.

BACKGROUND

Athletes and their trainers often keep track of the progress and conditioning of the athlete. Many computerized systems exist that collect biometric data from an athlete during training and subsequently process and display such information for use by the athlete or the trainer. Recently, such systems have become available where the sensor designed to collect the biometric data is incorporated into an athletic garment worn by the athlete.

With many existing athletic monitoring systems, biometric data for an athlete is collected by one or more sensing devices during a training session. The biometric data collected during the training session is stored in the memory of a computer that is carried by the athlete or within a line-of-sight of the athlete. For example, an athlete may wear a heart rate monitor during a training session, and data from the heart rate monitor may be transmitted to the memory of a handheld personal computer carried by the athlete (e.g., a wristwatch, portable media player, or other handheld personal computer in wired or wireless communication with the sensor). Following the training session, the handheld personal computer is moved to the vicinity of another computer with advanced processing capabilities, such as a desktop or laptop computer. The handheld personal computer is then connected to the additional computer with a wired or wireless connection, and data from the handheld personal computer is downloaded to the additional computer. The additional computer provides the athlete or other user with advanced options not available with the handheld computer alone, including the ability to perform various calculations on the data, view the processed data in various formats, and/or store the data for an extended period of time. Accordingly, with many present systems, data collected during a training session must first be downloaded by manually moving the athlete's handheld personal computer into close proximity with an advanced processing computer before complex calculations and other advanced processing options are performed on the data.

One example of an existing monitoring system is when an athlete wears a sensor, such as a heart rate monitor during a training session or other sporting exercise. The data collected from the heart rate monitor is sent to a transmitter, and the data is then wirelessly transmitted to a tablet or other handheld personal computer carried by the athlete. In addition, the data may also be transmitted to a team monitoring unit that is attached to a computer with an expanded memory and positioned within a line-of-sight of the athlete or otherwise located in close proximity to the athlete. The team monitoring unit is configured to receive data from multiple sensors worn by different athletes, if applicable, during the sporting event. The athlete may view his or her biometric data activity on the handheld personal computer worn by the athlete. At the completion of the sporting exercise, the athlete may also choose to manually connect the device to a personal computer, such as a laptop or desktop computer, and download the biometric data received by the device during the sporting event. The personal computer can then perform further processing on the data for viewing by the athlete. Likewise, a coach, trainer, or other individual may manually download the data collected at the team monitoring unit to a remote team computer at the completion of the sporting exercise. Alternatively, the team computer may be directly connected to the team monitoring unit such that the data is automatically transferred to the team computer. The team computer can then perform further processing on the data for viewing by the coach, trainer, athlete, or other individual.

In view of the foregoing, it would be desirable to provide a system and method for monitoring sport-specific athletic performance using biometric data from an athlete during a particular sporting activity and automatically processing the biometric data to analyze performance of body parts engaged in the particular sporting activity such that the processed data may be viewed in real time by one or more authorized individuals, on one or more platforms. It would also be advantageous if such a system and method could be utilized in numerous sporting venues. In addition, it would be advantageous if such a system was not limited to line-of-sight data transmissions or data transmissions in close proximity to an athlete being monitored.

BRIEF DESCRIPTION OF THE DRAWINGS

FIGS. 3A and 3B are schematic diagrams of a hitter top garment for use in association with a system for monitoring athletic performance of a baseball hitter in accordance with an embodiment of the present disclosure.

FIGS. 4A and 4B are schematic diagrams of a hitter bottom garment for use in association with a system for monitoring athletic performance of a baseball hitter in accordance with an embodiment of the present disclosure.

FIG. 4C is a schematic diagram of a hitter wearing the hitter top garment and the hitter bottom garment for use in association with a system for monitoring athletic performance of a baseball hitter in accordance with an embodiment of the present disclosure.

DETAILED DESCRIPTION

Figure 1A:
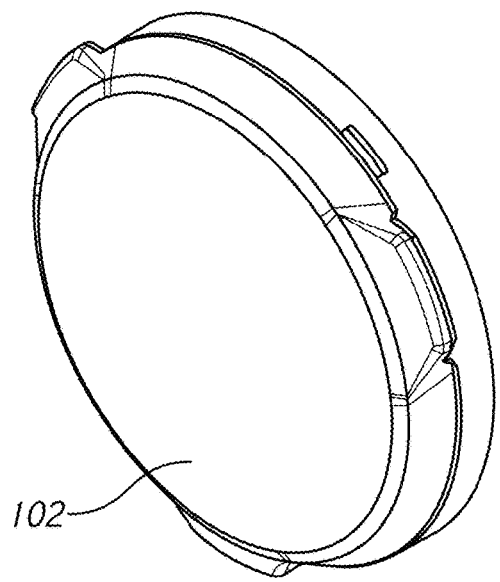
FIG. 1A is a schematic diagram of a communication device for use in association with a system for monitoring sport-specific athletic performance in accordance with an embodiment of the present disclosure.

Digital athlete ecosystem (DAE), a system for monitoring biometric data of an athlete participating in a sporting exercise including at least one biometric sensor carried by the athlete, is disclosed. The sensor senses biometric data, such as heartrate and signals based on muscle movement. The sensor transmits the biometric data to a wearable device located on a garment of the athlete. The device may automatically transmit the biometric data wirelessly as the athlete participates in the sporting exercise to an information-processing apparatus. The information-processing apparatus, such as a smartphone, a smartwatch, a wearable monitor, etc., may receive the biometric data transmitted from the wearable device. In some embodiments, the information-processing apparatus may be the wireless network, which in turn delivers the biometric data to a processing server via the internet. The processing server receives the biometric data and transforms the data into processed biometric data for the athlete. The processed biometric data for the sporting exercise is available to the athlete or other authorized individuals in real time and/or any time following the sporting exercise at a computer connected to the internet. The present application relates generally to computer software, mobile electronics, wireless communication links, and wearable monitoring systems. More specifically, techniques, fabrics, materials, systems, sensors, such as EMG sensors, circuitry, algorithms, and methods for wearable monitoring devices and associated performance regimens are described. A garment-borne sensor system may generate data on a user's performance during movement, for example, and the data may be analyzed in real time and feedback may be provided to the user based on the analysis. A piece of exercise equipment may be instrumented and in communication with the sensor system or other system and may be controlled in real time to adjust its settings to affect the user during the performance routine. Communication between the sensor system and other systems may be wireless. Conductive structures formed directly in a fabric of the garment may integrally include sensors, circuitry, controllers, conductive traces, and sensor electronics.

In the following description, various embodiments will be described. For purposes of explanation, specific configurations and details are set forth in order to provide a thorough understanding of the embodiments. However, it will also be apparent to skilled persons that the embodiments may be practiced without the specific details. Furthermore, well-known features may be omitted or simplified in order not to obscure the embodiment being described.

While the following preferred embodiments refer specifically to systems monitoring muscle performance for certain sports, such as baseball and basketball as examples, it should be appreciated that the same systems and methods may apply to other wearable sensor technologies based on specific body movements and no limitation is intended.

Referring to FIGS. 1A-11, exemplary embodiments of systems for monitoring an athlete's performance as the athlete participates in a sporting event are disclosed. The reader should understand that the embodiment discussed herein may be implemented in many alternative forms and variations. Furthermore, the term "sporting event" as used herein refers to any organized or unorganized event where a human participates in a team or individual competition, or a team or individual training session or activity. Examples of sporting events include both professional and amateur sports competitions (whether team or individual), team or individual practice sessions to further develop physical skills or prepare for a competition, and/or any team or individual physical workout, physical exercise, athletic conditioning or training session (whether or not in preparation for a competition), or entertainment activity involving physical exertion. The term "sporting venue" as used herein refers to a building, field, street, course, trail, stadium, facility, or any other location where a sporting event occurs. The term "sports stadium" refers specifically to a structure designed to facilitate human viewing of professional or amateur sports competitions with a playing field, floor, course, or competition area associated with the sports stadium. The term "athlete" as used herein refers to any human participating in a sporting event. The term "garment" as used herein refers to shirts, shorts, pants, socks, shoes, watches, wristbands, hats, headgear, or any other clothing, footwear, accessory, or equipment worn on the human body.

Figure 1B:
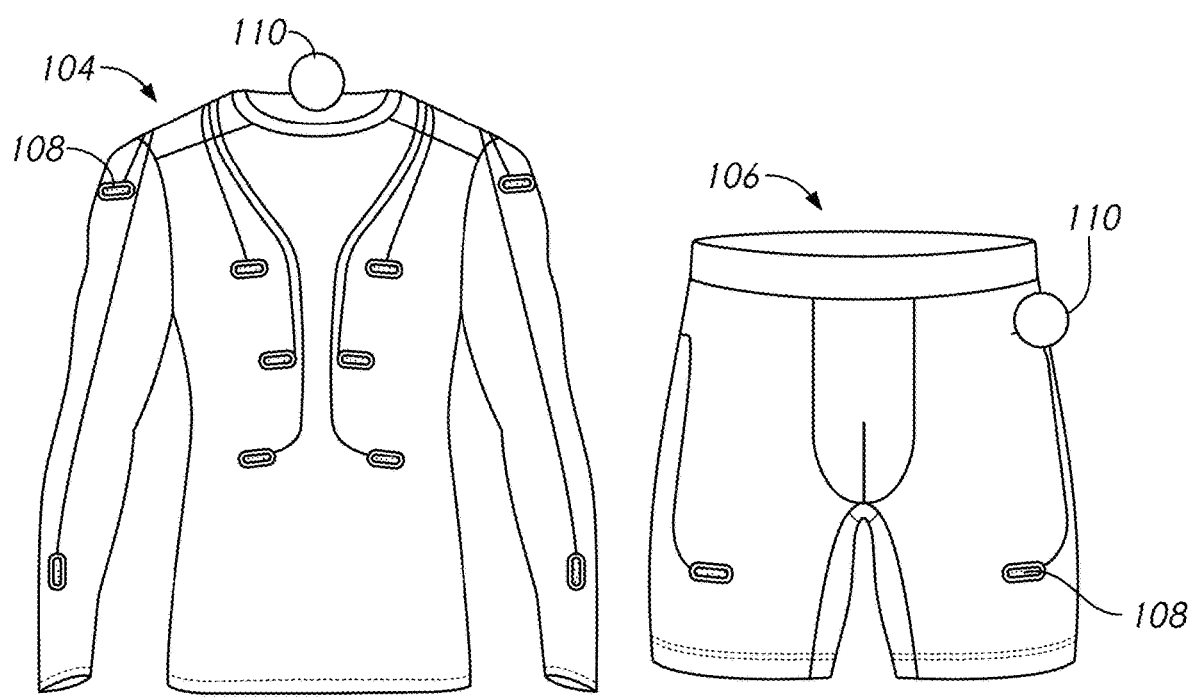
FIG. 1B is a schematic diagram of a top garment and a bottom garment for use in association with a system for monitoring sport-specific athletic performance in accordance with an embodiment of the present disclosure.

FIG. 1A is a schematic diagram of a communication device 102 for use in association with a system for monitoring sport-specific athletic performance in accordance with an embodiment of the present disclosure. FIG. 1B is a schematic diagram of a top garment 104 and a bottom garment 106 for use in association with a system for monitoring sport-specific athletic performance in accordance with one embodiment. With reference to FIGS. 1A and 1B, the top garment 104 and the bottom garment 106 are shown in the form of a shirt and shorts, respectively. In some examples, the top garment 104 and/or the bottom garment 106 may be equipped with the communication device 102 and sensors 108.

In some examples, the communication device 102 may be attached to the top garment 104 and/or the bottom garment 106. The top garment 104 and/or the bottom garment 106 may include a receptacle 110 configured to hold the communication device 102. In some examples, the communication device 102 may be in proximity to the top garment 104 and/or the bottom garment 106. The receptacle 110 on the shirt may be provided in any of numerous forms. The receptacle 110 may secure the communication device 102 in place on the top garment 104 and/or the bottom garment 106 when it is worn by the user. In some embodiments, the receptacle 110 secures the communication device 102 to the top garment 104 and/or the bottom garment 106 in a releasable fashion such that the communication device 102 may be removed from the top garment 104 and/or the bottom garment 106 by the user without damaging the receptacle 110 or the top garment 104 and/or the bottom garment 106. However, in an alternative embodiment, the communication device 102 may be secured on the top garment 104 and/or the bottom garment 106 in a permanent fashion.

The communication device 102 includes electronic circuitry comprising a receiver and a transmitter protected within a durable shell (the electronic circuitry for such transmitters and receivers is known to those of skill in the art and is not shown in the figure). The receiver is configured to receive biometric data signals from the biometric sensors provided on the garment or otherwise carried by the athlete. The transmitter may be configured to transmit received biometric data signals to a wireless network, such as Bluetooth, Near-field communication (NFC), Wi-Fi, cellular phone networks using Code-division multiple access (CDMA) or Frequency-division multiple access (FDMA), Worldwide Interoperability for Microwave Access (WiMAX), Global System for Mobile Communications (GSM) and/or 4G or 5G and/or long-term evolution (LTE) networks. In some embodiments, the transmitter may be a radio frequency (RF) transmitter that may transmit an RF signal to a nearby antenna in a wireless telephony network (e.g., about one-half mile to five miles or more to an antenna in a mobile telephony network). Accordingly, the communications module also includes a battery configured to power the receiver and the transmitter. In at least one embodiment, the battery of the communications module is a rechargeable battery. In this embodiment, the communications module may be placed in a battery charger configured for use with the communications module in order to recharge the battery. The battery provides the transmitter with sufficient power to transmit the RF signal.

The electronics for the communication device 102, including the receiver and transmitter, are housed within the shell to keep the electronics within the communication device 102 safe. Accordingly, the shell may be composed of a polymer, or fabric material capable of absorbing impacts without damage to the electronics embedded in the shell. Electrical contact may be provided on the communication device 102 to allow the communication device 102 to receive biometric data signals delivered from the sensors through a wire. Alternatively, the transmitter may be completely enclosed in the shell material and receive the signals from the sensors via a wireless connection. The term "bug" is also used herein to refer to the communication device 102. The communication device 102 may be of various sizes, shapes, and configurations, as will be recognized by those of skill in the art.

In some embodiments, the top garment 104 and/or the bottom garment 106 may be a compression-based garment that may hold sensors 108 in contact to target muscles of parts of the body, in a manner that the sensors 108 may detect the electric signals causing contraction of the target muscles. The top garment 104 and/or the bottom garment 106 may be designed to include pockets to hold the sensors 108 at locations in proximity to target muscles.

At least one sensor 108 is positioned on the top garment 104 and/or the bottom garment 106. The sensor 108 may sense biometric data from an athlete wearing the top garment 104 and/or the bottom garment 106 and deliver the sensed biometric data to the communication device 102. The sensors 108 may include any of numerous biometric sensors that may be used to sense various physiological conditions of the athlete. For example, the biometric sensors may include heart rate sensors, hydration sensors, body temperature sensors, muscle fatigue sensors, and numerous other sensors that may be provided in any of various different configurations and arrangements as will be recognized by those of skill in the art. In some examples, the sensors 108 may include at least one or more heart rate sensors, such as electrocardiogram (EKG or ECG) sensors that include electrodes to detect electric signals that cause heart beats. In some examples, the sensors may include at least one or more muscle sensors, such as EMG sensors that include electrodes to measure muscle response or electrical activity in response to a nerve's stimulation of the muscle at each part of the body during physical activities specific to a type of sport and/or a role in the sport.

Furthermore, the sensors 108 may also include environmental/positional sensors such as a global positioning system (GPS) receiver, air temperature sensor, or hygrometer. This data may also be transmitted from the communication device 102 to the wireless network. The sensors 108 may be incorporated directly into the garment, housed within the communication device 102, or may otherwise be worn or held by the athlete during the sporting event. For example, a heart rate sensor may be embedded in a shirt worn by the athlete or may be worn on a band encircling the athlete's chest. A GPS receiver may be provided directly in the communication device 102, fastened to a garment, or provided on a portable media player or telephone clipped to the athlete's waistband. Of course, these are but a few examples of sensors and configurations of sensors that may be used by the athlete in association with the communication device 102. In some embodiments, the sensors 108 may be incorporated into the top garment 104 and/or the bottom garment 106, and the sensors 108 may include electrical connections, such as traces, that lead directly to the receptacle 110, allowing the communication device 102 plugged into the receptacle 110 to receive signals from the sensors. Alternatively, the top garment 104 and/or the bottom garment 106 may include an electric connector adapted for connection to other sensors 108 that are not incorporated into the top garment 104 and/or the bottom garment 106. In yet another embodiment, each of the sensors 108 may include an associated transmitter that transmits the sensor signal to the communication device 102 in a wireless manner.

When an athlete wearing the top garment 104 and/or the bottom garment 106 with the attached communication device 102 participates in a sporting event, biometric data may be delivered to the communication device 102 from the sensors 108 worn by the athlete. The communication device 102 is configured to transmit one or more signals representative of the biometric data received by the communication device 102 to a wireless network (such as by an antenna). The transmission from the communication device 102 to the wireless network occurs automatically without the athlete needing to prompt the transmission. Because the transmissions are automatic, some mechanism may be used to turn on the transmitter of the communication device 102 or otherwise indicate that automatic transmissions should begin. For example, in one embodiment, an on/off switch may be provided on the communication device 102 that allows the athlete to begin automatic transmissions of data from the communication device 102. In another embodiment, the communication device 102 may be configured to begin transmissions once it starts receiving biometric data signals from one or more sensors 108 of the top garment 104 and/or the bottom garment 106 worn by the athlete. In yet another embodiment, the communication device 102 may only begin transmissions once the data signals received from the sensor indicate that an athletic event has started (e.g., increased heart rate or temperature).

In addition to automatic transmissions from the communication device 102, it will also be noted that the transmission of data from the communication device 102 to the network occurs in real time, i.e., at the same time the athlete participates in the sporting event. In one embodiment, the communication device 102 transmits biometric data immediately upon receipt of a signal from the sensor 108 in contact with a body part of the athlete. However, in other embodiments, the communication device 102 may be configured to conserve power by only transmitting data in a periodic fashion, such as once every second, once every 10 seconds, once every 30 seconds, etc. In these embodiments, the electronics package for the communication device 102 may include a memory device configured to store a limited amount of data taken over a short period of time and then transmit that data and associated time information in a single transmission. In any event, the communication device 102 is configured to regularly and automatically transmit data to a wireless network as the athlete participates in the sporting event.

The wireless network may comprise any of several known or future network types. For example, the wireless network may comprise commonly used Bluetooth, NFC, Wi-Fi, cellular phone networks using CDMA or FDMA, WiMax, GSM and/or 4G or 5G and/or LTE networks, as well as various other current or future wireless telecommunications arrangements. In some embodiments, the wireless network may be connected to local devices to provide direct communications. In some embodiments, the wireless network may be connected to the internet via a Wi-Fi router or the hardware of Wi-Fi or the particular mobile service provider. In some embodiments, the biometric data received at the antenna of the wireless network is passed on to one or more computers in the form of processing servers via the internet. In some embodiments, each processing server may be remotely located from the sporting venue where the athlete is participating in the sporting event. For example, one processing server may be housed at one or more facilities of a manufacturer of the top garment 104 and/or the bottom garment 106, a team, or a related service provider offering data processing services. The processing server may comprise a single internet server, or a server connected to other computers that perform processing and data storage functions. In at least one alternative embodiment, the processing server may be located at the sporting venue where the athlete is participating in the sporting event. For example, the processing server could be located within the same stadium where an athlete is participating.

The processing server collects the raw biometric data received for the athlete wearing the top garment 104 and/or the bottom garment 106 and processes the data itself or passes the data to connected computers for processing. The processing computer may perform various calculations on the data and also process the data into any of various forms. Typical calculations performed by the computer might relate to the athlete's current performance, improvement, history, training state, etc. For example, if heart rate data for the athlete is collected, the processing server may plot the data on a graph showing the athlete's heart rate during the entire sporting event. As another example, if body temperature data is collected, the processor may calculate an average body temperature during the sporting event and display the average body temperature on a historical chart of average body temperatures for other sporting events. If GPS data is collected, the speed of the athlete may be calculated over different time periods. Furthermore, the biometric data may be processed into different forms and formats, depending on the particular device that will ultimately be used to view the processed data. For example, the data may be processed into a first format that will allow it to be viewed on a watch and into a second format that will allow it to be viewed on the monitor of a personal computer. While these are but a few examples of how the raw data may be processed, those of skill in the art will recognize that nearly countless other possibilities exist for how the data received from the top garment 104 and/or the bottom garment 106 will be processed for subsequent viewing and analysis.

In addition to processing of the raw data itself, the processing server may be further configured to strategically associate additional data with the processed data for presentation to the athlete or other individuals upon authentication. For example, the processing server may make an analysis of the athlete's progress and recommend a new or different training regime that may assist the athlete in improving in a particular area. Accordingly, the processing server has the ability to act as a virtual personal trainer for the athlete. The fact that the processed data may be delivered to the athlete in real time also allows for suggestions or encouragement to be made to the athlete during the actual sporting event (e.g., an audio clip of "you're doing great" or "your heart rate is too fast—slow down"). Furthermore, because of the server's relatively large processing power, the system provides the ability to continuously analyze and learn more about the athlete who is being monitored, such as heart rate patterns during athletic activity. With such learned knowledge, the system is also able to better determine when the athlete's activity is becoming risky or dangerous to his or her health or when the athlete is improving in a particular area.

After the raw data is processed by the computer, it may be accessed by one of several viewing devices via the internet. Thus, the computer may include one or more computers that perform data processing functions and also act as internet servers.

The processed biometric data available on the server may be accessed and displayed or otherwise presented on a smartwatch, portable media player, or smartphone, or any other device that may be worn, carried, or held by the athlete and is equipped with an appropriate wireless receiver or other means for connecting to the internet. A smartwatch, smartphone, or portable media player are referred to herein collectively as "portable devices." Such devices may include screens for viewing the processed biometric data, speakers or other audible output devices for sounding information about the processed biometric data, vibration devices, and/or other output devices for transmitting information related to the processed data. In addition, the processed biometric data may be accessed and viewed on a personal computer, such as a laptop computer, a desktop computer, or a tablet. A computing device, such as a portable device or a personal computer, may be connected to the internet or wireless network to receive the processed data. In some embodiments, the computing device may be connected to the internet via a wired connection. However, for the portable devices this connection to the internet may be made using a wireless network (such as Bluetooth, NFC, Wi-Fi, cellular phone networks using CDMA or FDMA, WiMax, GSM and/or 4G or 5G and/or LTE networks, etc.). Of course, the personal computer may also be connected to the internet via a wireless network. For example, if the personal computers and the portable devices are Wi-Fi enabled, the connection to the internet may be made so long as the Wi-Fi-enabled device can establish connection with a Wi-Fi hotspot. The computing device may also be connected to the internet using other wireless networks, such as WiMax or traditional cellular telephone networks.

The foregoing arrangement provides for a system where an athlete wearing the top garment 104 and/or the bottom garment 106 with the communication device 102 is connected to the internet in real time as he or she actually participates in a sporting event. Because the transmission of the biometric data occurs automatically, there is no need for the athlete to take any particular action to download the data to the internet during or after participation in an athletic event. For example, there is no need for the user to connect any device to a personal computer at the end of a sporting event for the purpose of downloading biometric data to the processing server. Instead, such transmission of biometric data occurs automatically during the sporting event without the athlete needing to take any positive steps during or after the sporting event to transmit the sensed biometric data to a processing server. The transmitted data is automatically processed and available for viewing by the athlete at any time, including during the sporting event, the same day of the sporting event, or several days after the sporting event without any positive steps required by the athlete to download data after the sporting event. Furthermore, because the athlete is connected to the internet during the actual sporting event and sensed biometric data is automatically transmitted to the processing server, there is no need to process and store as much data on the athlete's body as is stored with current systems. Increased data storage and data processing capabilities are provided at the processing server. Such increased data processing and storage capabilities are simply not possible with prior art systems where data is stored and processed on devices worn by the individual. Furthermore, because the communication device 102 on the top garment 104 and/or the bottom garment 106 includes a transmitter configured to transmit data using the wireless network, the system is configured for use in any location having access to a wireless network. Thus, the system may be used in relatively remote locations. Furthermore, a system is provided where no additional equipment is needed for real-time monitoring other than a the top garment 104 and/or the bottom garment 106 with an associated communication device 102 and a viewing device (e.g., a computer, smartwatch, and/or smartphone).

The processed data from a server may also be returned to a computing device coupled to a display via a wireless network. The electronic circuitry of the communication device 102 includes a processor/filter configured to receive data signals from the sensor(s). The sensors may send data signals to the processor/filter over a wired or wireless connection to the processor filter. The processor/filter includes circuitry that filters noise from the received data signals and then delivers the filtered data signals to a transmitter. The transmitter may be a cellular (e.g., CDMA or FDMA, WiMax, GSM and/or 4G or 5G and/or LTE, etc.) transmitter configured to transmit the filtered data signals to a wireless network.

A system may be used to monitor a whole team or group of athletes rather than a single athlete. The top garment 104 and/or the bottom garment 106 including the communication device 102 may be worn by a team of athletes. The athletes may all participate in a sporting event at a sporting event venue. The communication device 102 on the top garment 104 and/or the bottom garment 106 transmits data for the athlete to a wireless network. That raw data is then passed on to the processing server via the internet. After the data is processed, it is available for viewing by a coach or a trainer at a computer that is also located at the event venue. In addition, because the processed data is available via a processing server, the processed data may also be viewed at remote locations that are not associated with the event venue. The processed data may include calculations for the individuals as well as the entire team. Furthermore, the processed data may be used to compare the physiological conditions of a plurality of athletes on the team. Such data may be used by the coach, trainer, or other individuals to make decisions related to individuals or the team as a whole. For example, a coach may use the processed biometric data to decide which of two closely matched players should start a game. Numerous other examples are possible as real-time and historical performance data for individual athletes and teams are available using the system. This allows data on athletes and teams to be collected over short periods as well as long periods of time, such as data collected over many years.

A system may be used in association with a group of athletes. A plurality of athletes may be positioned on a playing field in a sports stadium. A plurality of laptop computers or handheld personal computers may have been brought to the stadium by coaches, trainers, broadcasters, and/or fans watching the sporting event. Accordingly, the laptop computers are located throughout the stadium, such as on the sidelines, in the press box, in the stands, in the locker rooms, and/or in the training rooms of the stadium. As the athletes participate in the competition, biometric data from the athletes is transmitted to a cellular network including a plurality of antennas. The cellular network is connected to the servers of an internet service provider. The internet service provider is connected to the internet. The servers and other computers of a processing center are also connected to the internet. Accordingly, the biometric data transmitted to the cellular network from the playing field is passed on to the internet service provider and then to the processing center via the internet. The biometric data is then processed and used to perform various calculations and prepare reports and other information to be made available for the individuals viewing the competition at the sports stadium. Typically, access to such processed data would only be made available to certain individuals following an authentication procedure, such as entry of a username and password in order to access the processed data. The processed information may be viewed on the laptop computers located at various locations throughout the sports stadium. In the disclosed embodiment, the laptop computers are Wi-Fi enabled and connected to the internet via a wireless network. Furthermore, it will also be appreciated that because the processed data may be accessed via the internet, the processed data may also be made available to other authenticated individuals who are removed from the sports stadium, such as fans watching the competition on television who have paid for a service that allows them to view the authenticated data.

Different processed data may be available to different parties based on authentication/security clearances and procedures such as username and password combinations. For example, the coaches and trainers for one team may have access to all the individual physiological data for the players on that team. Likewise, the coaches and trainers for the opposing team may have access to all the individual physiological data for the players on the opposing team. Sportscasters and others in the broadcast booth or the stands may only have access to more limited information, such as limited physiological data (e.g., heart rate only) on a single player or a limited number of players.

Using the information made available to those at the sports stadium, various decisions affecting physical outcomes may be made. For example, a coach may decide to bench a particular player if the athlete's heart rate is too high, indicating exhaustion and inability to perform. Similarly, the cameras of the broadcaster may focus on a particular player if it is noted that the player has a particular physiological condition, such as an elevated level of perspiration or an elevated heart rate, and the broadcasters may wish to comment on this.

A method for monitoring athletic performance begins by outfitting athletes with garments, such as the top garment 104 and the bottom garment 106 carrying at least one communication device 102 and biometric sensors 108 in communication with the at least one communication device 102. The communication device 102 is used to transmit biometric data from the athletes participating in a sporting event at a sporting venue to a wireless network. The biometric data is relayed on to the internet and delivered to a processing server connected to the internet. The processing server processes the biometric data in order to calculate data about the athlete's performance, history, condition, etc. The processing server processes and stores this information in a location that is removed from the sporting venue. The processed data is then delivered to the sports venue via the internet. A coach reviews the processed biometric data and makes a coaching decision based on the data. The coaching step is then implemented during the sporting event at the sporting arena. For example, based on the provided biometric data, the coach may determine that a particular athlete is exhausted and not capable of playing to full potential. The coach may then decide to rest the athlete or temporarily remove the athlete from the sporting event until he or she is rested and ready to return to the game.

It will be recognized that the above-discussed method is but one example of a physical transformation resulting from the system described herein. Another example of such a physical transformation is that of an athlete slowing down during a training exercise in response to a warning from the processing server that the athlete's heart rate is too high. Those of skill in the art will recognize that numerous other physical transformations may also result from use of the system described herein.

The communication device 102 and receptacle 110 may include various embodiments to be utilized on garments for the above-described system. In one embodiment, the communication device 102 may be a disk-shaped device retained in a complementary circular polymer receptacle 110 that is fastened to a central location on a garment. The receptacle 110 may include a deformable ring that helps retain the communication device 102 in place within the housing, while also allowing the communication device 102 to be easily removed from the housing. A sensor may be an ear temperature sensor with a wired connection to the collar of the top garment 104. An electrical connection extends between the collar and the receptacle allowing sensor data to be relayed from the sensor to the communication device 102.

In one embodiment, the receptacle 110 may be a pocket configured to receive the communication device 102. In particular, the communication device 102 is slid downwardly in the pocket until it is properly seated and an electrical connection is established between the communication device 102 and the receptacle. Both the pocket and the communication device 102 may be substantially rectangular in shape.

In one embodiment, the receptacle 110 may be a pocket with a flexible covering. A slit opening is provided in the flexible covering that is large enough to receive the communication device 102. Electrical connectors may be provided on the back side of the communication device 102 with complementary connectors provided in the pocket of the receptacle 110. In some embodiments, the communication device 102 and complementary pocket may both be substantially in a similar shape, either rectangular or oval. Each of the top garment 104 and the bottom garment 106 may include sensors 108 (e.g., a heart rate sensor, a muscle sensor, a hydration sensor, etc.) that are fixed upon each of the top garment 104 and the bottom garment 106 and electrically connected to the receptacle 110.

In another embodiment, the polymer receptacle 110 with an open pocket and flexible side arms help to retain the communication device 102 in place on the receptacle 110. The receptacle 110 may be bonded to the shirt fabric via thermo-plastic adhesive films that are melted using RF welding or heat pressing. Flexible polymer mushrooms may be provided in the receptacle 110 that engage small complementary holes in the communication device 102 to secure the communication device 102 in place on the receptacle 110. Both the communication device 102 and the complementary pocket are substantially rectangular in shape.

In another embodiment, the receptacle 110 is a covered polymer, or fabric, pocket. The receptacle 110 may be provided on the sleeve of the top garment 104. The receptacle 110 includes an opening formed by two overlapping polymer, or fabric, flaps on the pocket. When the flaps are deformed away from each other, the communication device 102 may be inserted into the pocket. Once again, both the communication device 102 and the complementary pocket are substantially rectangular in shape.

In another embodiment, the receptacle 110 is only a partially covered polymer, or fabric, pocket. The communication device 102 may be slid into the pocket until it is seated in the pocket and an electrical connection is made between the receptacle and the communication device 102. The communication device 102 and the pocket may be substantially trapezoidal in shape. Furthermore, the pocket may be provided on an upper location of the top garment 104 near the collar.

Therefore, the user may obtain performance of muscle contraction associated with target muscles while performing the sport-specific activity, while the user is wearing a sport-specific garment including sensors to be in contact with the target muscles.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium—for example, in the form of a computer program comprising a plurality of instructions executable by one or more processors. The computer-readable storage medium may be non-transitory.

Figure 2:
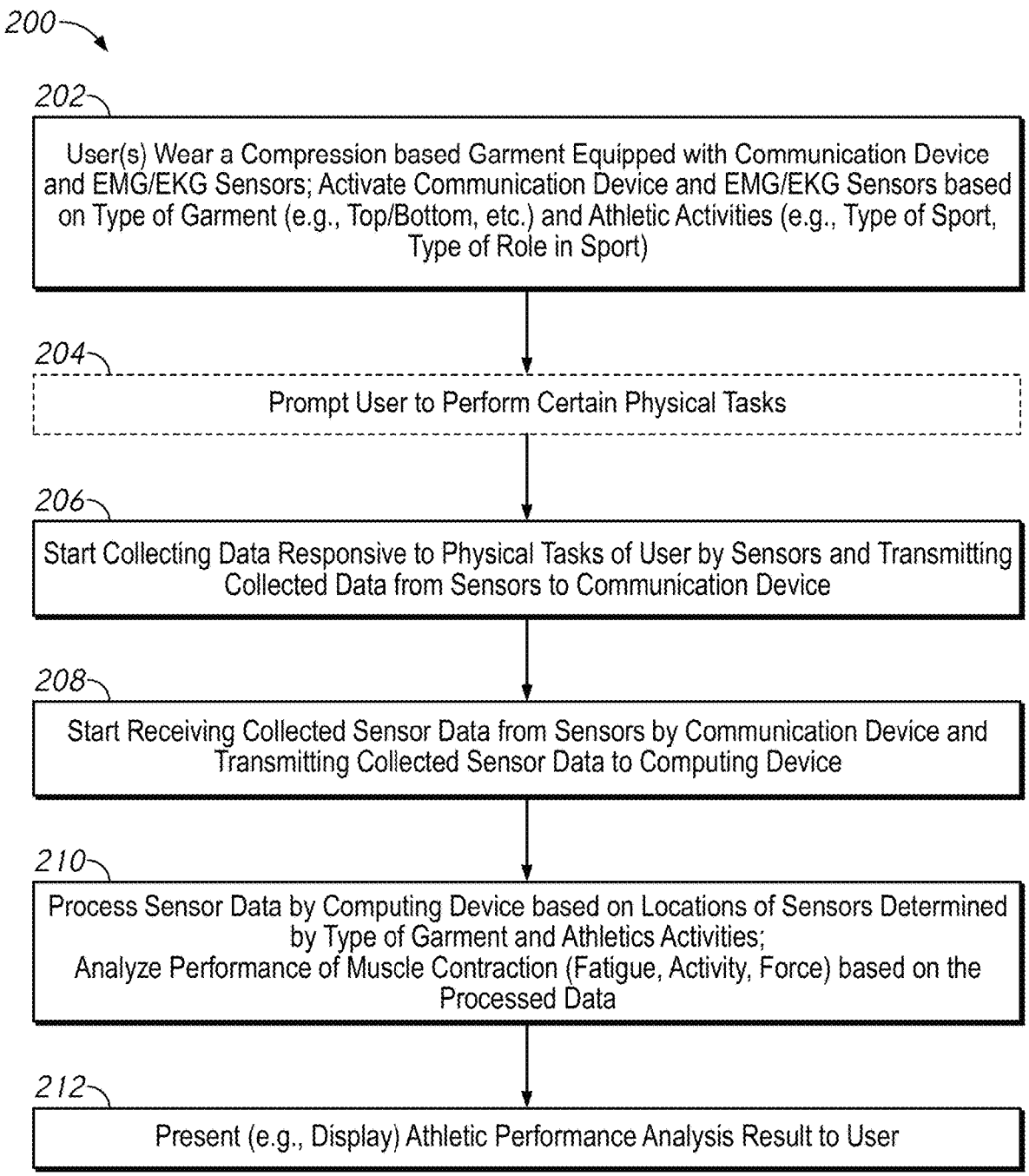
FIG. 2 is a flow diagram of a method for monitoring sport-specific athletic performance in accordance with an embodiment of the present disclosure.

FIG. 2 is a flow diagram of a method for monitoring sport-specific athletic performance in accordance with an embodiment of the present disclosure. FIG. 2 shows an example process 200 of the method for monitoring sport-specific athletic performance. The process 200 includes initialization block 202, user prompt block 204, data collection block 206, data transmission block 208, data processing and performance analysis block 210, and performance analysis presentation block 212. Once the process 200 starts, a computing device may perform the initialization block 202. In the initialization block 202, one or more users may wear a compression based garment, such as the top garment 104 and/or the bottom garment 106 of FIG. 1B. In some embodiments, the computing device may prompt the user to wear the garment. Then a communication device, such as the communication device 102 of FIG. 1A, attached to the garment and sensors in the garment, such as sensors 108 in FIG. 1B, may be activated. In some embodiments, a number of sensors to be activated and locations of the activated sensors may be determined based on type of garment (e.g., top/bottom, etc.) and athletic activities (e.g., type of sport, type of role in sport).

In some embodiments, in the user prompt block 204, the computing device that handles user interface may prompt the user to perform one or more physical tasks in physical activities specific to the type of sport and/or the role in the sport. In some embodiments, the computing device may cause a display that is on the computing device or coupled to the computing device to display instructions to the user on a screen. In some embodiments, the computing device may cause a speaker, headphones, in-ear phones, etc., to produce speech announcing instructions to the user. Alternatively, the instructions may be distributed to the user as a printed manual or an online manual. For example, the one or more physical tasks may be, hitting or pitching in a baseball game, throwing in a basketball game, swinging in a golf game; however, the one or more physical tasks are not limited to these listed in the example. This user prompt block 204 may be optional, and athletic performance may be monitored throughout the physical activities, without prompting the user to perform a predetermined physical task.

Next, the process 200 may proceed to the data collection block 206. In the data collection block 206, the sensors may start collecting data responsive to physical tasks of the user. In some examples, the sensors may include at least one or more heart rate sensors, such as EKG sensors that include electrodes to detect electrical signals that cause heart beats. In some examples, the sensors may include at least one or more muscle sensors, such as EMG sensors that include electrodes to measure muscle response or electrical activity in response to a nerve's stimulation of the muscle at each part of the body during physical activities specific to a type of sport and/or a role in the sport. The sensors may transmit the collected data to the communication device. In some examples, the collected data may be raw data reflecting electrical signals detected by the sensors. In some examples, the sensor may be coupled to the communication device by wires, such as traces. In some examples, the sensor may be coupled to the communication device using a wireless technology, such as Bluetooth or NFC. The communication between the communication device and the sensors may be established in a manner that the communication device may determine associated channels transmitting signals and sensors located in proximity to target body parts. The transmissions are timely in a manner that the electric signals detected by sensors are communicated for accurate assessment of the performance.

The process 200 may proceed to the data transmission block 208. In the data transmission block 208, the communication device may receive collected sensor data from the sensors and transmit the collected sensor data to the computing device.

The process 200 may proceed to the data processing and performance analysis block 210. In some embodiments, the data processing and performance analysis may be executed while data collection is ongoing throughout the physical activities. In some embodiments, the data processing and performance analysis may be executed once an instructed physical task is completed. The computing device may process sensor data based on locations of sensors determined by type of garment and athletic activities. In some examples, the athletic activities may be defined by the type of sport and/or the role in the sport. In some embodiments, performance of muscle contraction at target muscles may be analyzed based on the processed data. In some embodiments, performance of muscle contraction may include parameters associated with at least one of fatigue, force, or activity. In some embodiments, a heart rate of the user may also be analyzed concurrently with the analysis of the performance of muscle contraction at target muscles. This performance analysis may be done as many times to collect the performance data the user may need.

Once the performance analysis is executed, the computing device may proceed to the performance analysis presentation block 212 to present analysis results. In some embodiments, the computing device may cause a display that is on the computing device or coupled to the computing device to display analysis results to the user on a screen. For example, the analysis results may be shown as indicating performance of muscle contraction in parameters associated with at least one of fatigue, force, or activity. In some embodiments, the analysis results may include a heart rate or a cardiograph measured concurrently with the performance of muscle contraction. In some embodiments, the parameters may be shown in numbers on the screen. In some embodiments, the parameters may be translated into several performance levels associated with colors, and human anatomy with body parts in one or more colors corresponding to the translated one or more performance levels of the body parts on the screen. In some embodiments, the performance results may be shown in a time sequence accompanied with a simultaneous video playback of the physical task/activity. In some embodiments, the computing device may cause a speaker, headphones, in-ear phones, etc., to produce speech announcing the performance of muscle contraction in parameters to the user. By performing the process while the user is wearing a sport-specific garment including sensors to be in contact with target muscles, the user may obtain performance of muscle contraction associated with the target muscles while performing the sport-specific activity.

FIGS. 3A and 3B are schematic diagrams of a hitter top garment 302 for use in association with a system for monitoring athletic performance of a baseball hitter in accordance with an embodiment of the present disclosure. The hitter top garment 302 may be the top garment 104 of FIG. 1B, including compression material. FIG. 3A is a front view of the hitter top garment 302 and FIG. 3B is a rear view of the hitter top garment 302. A communication device 304, such as the communication device 102 of FIG. 1, may be attached to the hitter top garment 302. The hitter top garment 302 may include sensors coupled to the communication device 304, via traces or wirelessly using Bluetooth or NFC, for example. In some examples, the sensors may include a heart rate reference sensor 306a and a heart rate sensor 306b, a muscle reference sensor 308a and muscle sensors 308b, in a manner that the hitter top garment 302 may hold the sensors tightly in contact with corresponding target muscles of a user.

In some examples, the heart rate reference sensor 306a and the heart rate sensor 306b may include ECG sensor electrodes positioned closer to the heart of the user. For example, the hitter top garment 302 may hold the heart rate reference sensor 306a on the right middle chest (e.g., in proximity to the rectus abdominis muscle) of the user, and the hitter top garment 302 may hold the heart rate sensor 306b on the right upper chest (e.g., in proximity to the pectoralis major muscle), as shown in FIG. 3A.

In some examples, the muscle reference sensor 308a and the muscle sensors 308b may include EMG sensor electrodes positioned closer to target muscles of the user. The choice of locations of the muscle sensors 308b may be determined by target muscles substantially us ed in hitting activities of baseball. For example, the hitter top garment 302 may hold the muscle reference sensor 308a on the left side of the back of the user, and the hitter top garment 302 may hold the muscle sensors 308b in proximity to the rectus abdominis muscle, pectoralis major muscle, deltoid muscles 410 and forearms 412 of FIG. 4C, and obliquus externus, as shown in FIG. 3A, and trapezius muscles 414 and latissimus dorsi muscles 416 of FIG. 4C as shown in FIG. 3B.

FIGS. 4A and 4B are schematic diagrams of a hitter bottom garment 402 for use in association with a system for monitoring athletic performance of a baseball hitter in accordance with an embodiment of the present disclosure. FIG. 4C is a schematic diagram of a hitter 408 wearing the hitter top garment 302 and the hitter bottom garment 402 for use in association with a system for monitoring athletic performance of a baseball hitter in accordance with an embodiment of the present disclosure. The hitter bottom garment 402 may be the bottom garment 106 of FIG. 1B, including compression material. FIG. 4A is a front view of the hitter bottom garment 402 and FIG. 4B is a rear view of the hitter bottom garment 402. A communication device 404, such as the communication device 102 of FIG. 1, may be attached to the hitter bottom garment 402. The hitter bottom garment 402 may include sensors coupled to the communication device 404, via traces or wirelessly using Bluetooth or NFC, for example. In some examples, the sensors may include a muscle reference sensor 406a and muscle sensors 406b, in a manner that the hitter bottom garment 402 may hold the sensors tightly in contact with corresponding target muscles of a user.

In some examples, the muscle reference sensor 406a and the muscle sensors 406b may include EMG sensor electrodes positioned closer to target muscles of the user. The choice of locations of the muscle sensors 406b may be determined by target muscles substantially used in hitting activities of baseball. For example, the hitter bottom garment 402 may hold the muscle reference sensor 406a on the right side of the back of the user, and the hitter bottom garment 402 may hold the muscle sensors 406b in proximity to rectus femorum 422, as shown in FIG. 4A, and gluteus maximus muscles 418 and biceps femorum 420 as shown in FIG. 4B.

Figure 5A:
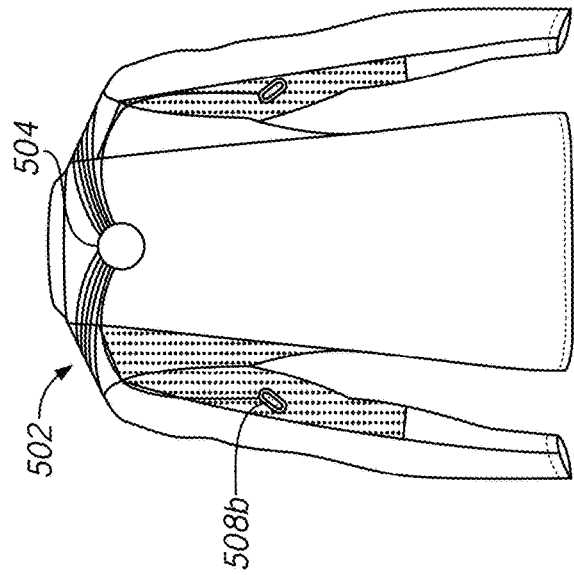
FIGS. 5A and 5B are schematic diagrams of a pitcher top garment for use in association with a system for monitoring athletic performance of a baseball pitcher in accordance with an embodiment of the present disclosure.
Figure 5B:
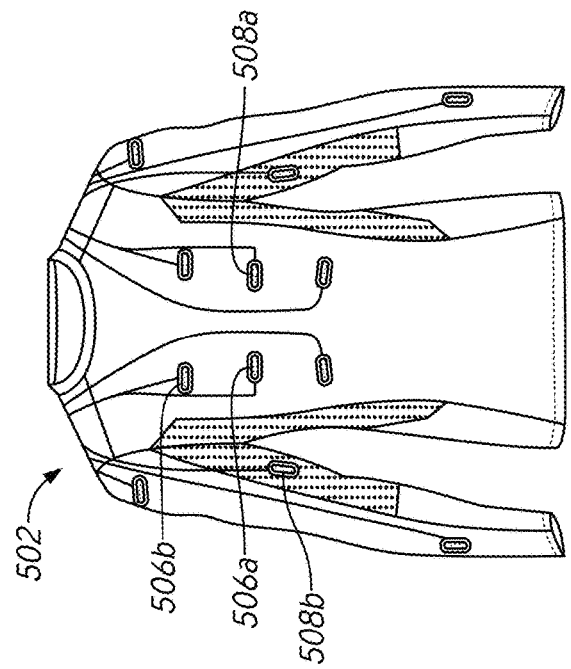

FIGS. 5A and 5B are schematic diagrams of a pitcher top garment 502 for use in association with a system for monitoring athletic performance of a baseball pitcher in accordance with an embodiment of the present disclosure. The pitcher top garment 502 may be the top garment 104 of FIG. 1B, including compression material. FIG. 5A is a front view of the pitcher top garment 502 and FIG. 5B is a rear view of the pitcher top garment 502. A communication device 504, such as the communication device 102 of FIG. 1, may be attached to the pitcher top garment 502. The pitcher top garment 502 may include sensors coupled to the communication device 504, via traces or wirelessly using Bluetooth or NFC, for example. In some examples, the sensors may include a heart rate reference sensor 506a and a heart rate sensor 506b, muscle reference sensors 508a and muscle sensors 508b, in a manner that the pitcher top garment 502 may hold the sensors tightly in contact with corresponding target muscles of a user.

In some examples, the heart rate reference sensor 506a and the heart rate sensor 506b may include ECG sensor electrodes positioned closer to a heart of the user. For example, the pitcher top garment 502 may hold the heart rate reference sensor 506a on the right middle chest of the user, and the pitcher top garment 502 may hold the heart rate sensor 506b on the right upper chest, as shown in FIG. 5A.

In some examples, the muscle reference sensor 508a and the muscle sensors 508b may include EMG sensor electrodes positioned closer to target muscles of the user. The choice of locations of the muscle sensors 508b may be determined by target muscles substantially used in pitching activities of baseball. For example, the pitcher top garment 502 may hold the muscle reference sensor 508a on the left middle chest of the user, and the pitcher top garment 502 may hold the muscle sensors 508b in proximity to biceps typically used for throwing balls, abdominal muscles, deltoid muscles, and forearms, as shown in FIG. 5A, and triceps typically used for throwing balls as shown in FIG. 5B.

Figure 6A:
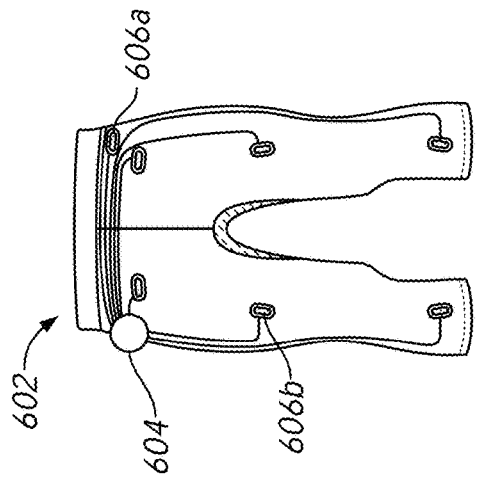
FIGS. 6A and 6B are schematic diagrams of a pitcher bottom garment for use in association with a system for monitoring athletic performance of a baseball pitcher in accordance with an embodiment of the present disclosure.
Figure 6B:
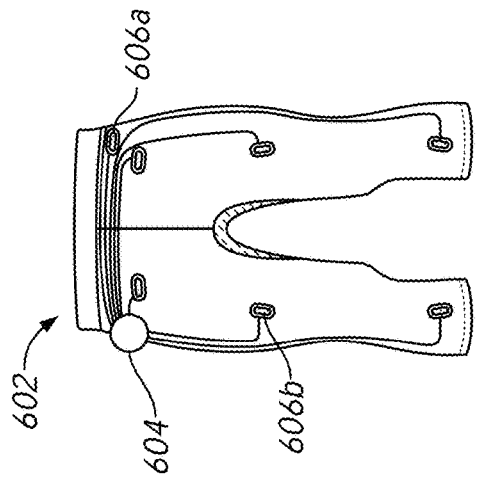

FIGS. 6A and 6B are schematic diagrams of a pitcher bottom garment 602 for use in association with a system for monitoring athletic performance of a baseball pitcher in accordance with an embodiment of the present disclosure. The pitcher bottom garment 602 may be the bottom garment 106 of FIG. 1B, including compression material. FIG. 6A is a front view of the pitcher bottom garment 602 and FIG. 6B is a rear view of the pitcher bottom garment 602. A communication device 604, such as the communication device 102 of FIG. 1, may be attached to the pitcher bottom garment 602. The pitcher bottom garment 602 may include sensors coupled to the communication device 604, via traces or wirelessly using Bluetooth or NFC, for example. In some examples, the sensors may include a muscle reference sensor 606a and muscle sensors 606b, in a manner that the pitcher bottom garment 602 may hold the sensors tightly in contact with corresponding target muscles of a user.

In some examples, the muscle reference sensor 606a and the muscle sensors 606b may include EMG sensor electrodes positioned closer to target muscles of the user. The choice of locations of the muscle sensors 606b may be determined by target muscles substantially used in pitching activities of baseball. For example, the pitcher bottom garment 602 may hold the muscle reference sensor 606a on the right side of a back of the user, and the pitcher bottom garment 602 may hold the muscle sensors 606b in proximity to rectus femorum and tibiales as shown in FIG. 6A, and gluteus maximus muscles, biceps femorum, and gastrocnemii as shown in FIG. 6B.

Figures 7A, 7B, 7C:
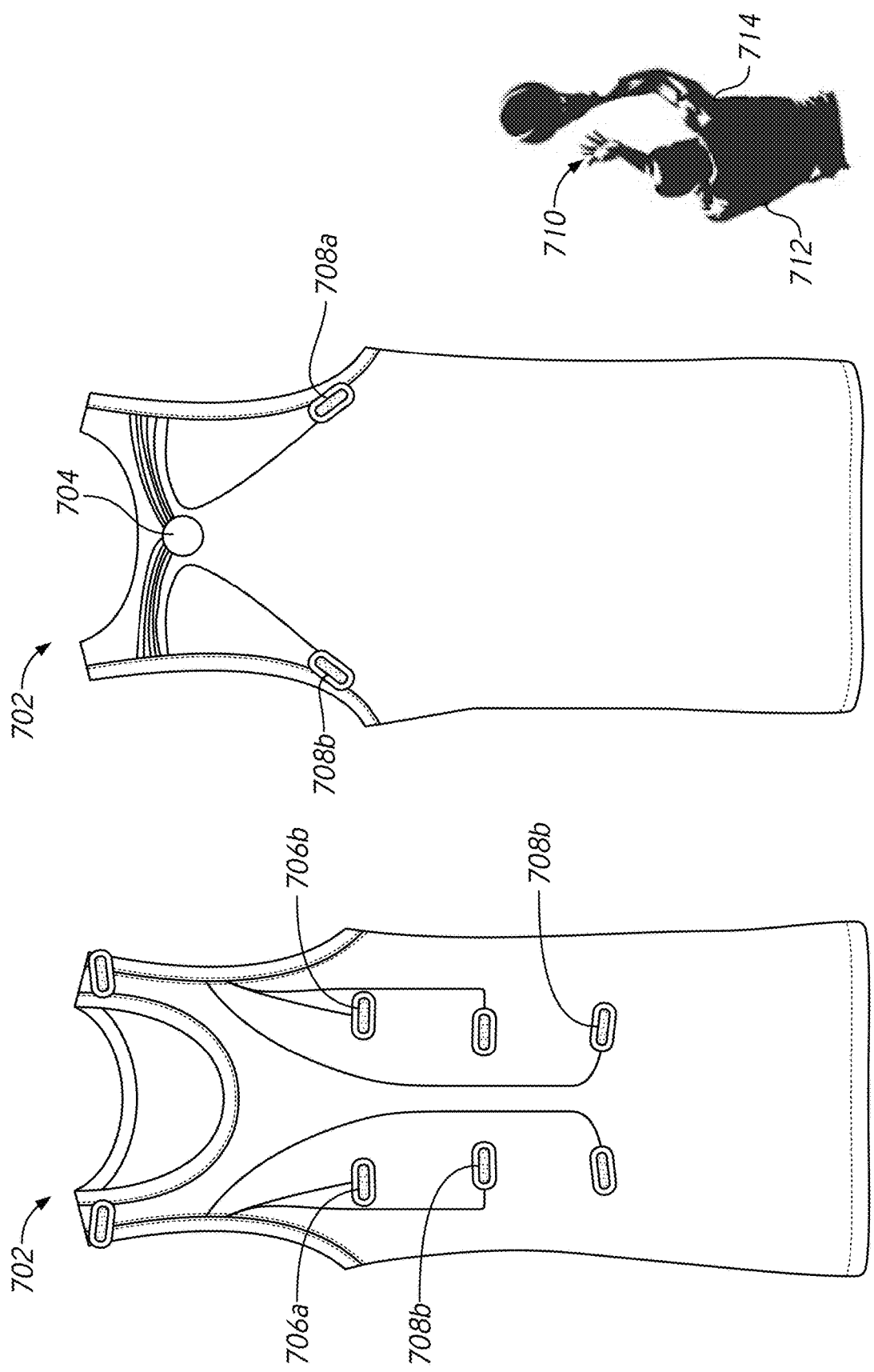
FIGS. 7A and 7B are schematic diagrams of a basketball top garment for use in association with a system for monitoring athletic performance of a basketball player in accordance with an embodiment of the present disclosure.
FIG. 7C is a schematic diagram of a basketball player wearing the basketball top garment for use in association with a system for monitoring athletic performance of a basketball player in accordance with an embodiment of the present disclosure.

FIGS. 7A and 7B are schematic diagrams of a basketball top garment 702 for use in association with a system for monitoring athletic performance of a basketball player in accordance with an embodiment of the present disclosure. FIG. 7C is a schematic diagram of a basketball player 710 wearing the basketball top garment 702 for use in association with a system for monitoring athletic performance of a basketball player in accordance with an embodiment of the present disclosure. The basketball top garment 702 may be the top garment 104 of FIG. 1B, including compression material. FIG. 7A is a front view of the basketball top garment 702 and FIG. 7B is a rear view of the basketball top garment 702. A communication device 704, such as the communication device 102 of FIG. 1, may be attached to the basketball top garment 702. The basketball top garment 702 may include sensors coupled to the communication device 704, via traces or wirelessly using Bluetooth or NFC, for example. In some examples, the sensors may include a heart rate reference sensor 706a and a heart rate sensor 706b, a muscle reference sensor 708a and muscle sensors 708b, in a manner that the basketball top garment 702 may hold the sensors tightly in contact with corresponding target muscles of a user.

In some examples, the heart rate reference sensor 706a and the heart rate sensor 706b may include EKG sensor electrodes positioned closer to a heart of the user. For example, the basketball top garment 702 may hold the heart rate reference sensor 706a on the right upper chest of the user, and the basketball top garment 702 may hold the heart rate sensor 706b on the left upper chest, as shown in FIG. 7A.

In some examples, the muscle reference sensor 708a and the muscle sensors 708b may include EMG sensor electrodes positioned closer to target muscles of the user. The choice of locations of the muscle sensors 708b may be determined by target muscles substantially used in performing activities of basketball. For example, the basketball top garment 702 may hold the muscle reference sensor 708a on the right upper back of the user, and the basketball top garment 702 may hold the muscle sensors 708b in proximity to, for example, deltoid muscles 714 in FIG. 7C, abdominal muscles, etc., as shown in FIG. 7A, and subscapulares 712 in FIG. 7C, typically used for throwing basketballs as shown in FIG. 7B.

Referring to FIGS. 3A-7C, the variety of types of garments with sensors corresponding with target muscles substantially used for sport-specific activities for monitoring muscle performance have been described. By wearing compression garments with sensor in proximity to target muscles, performance of muscle contraction, such as parameters related to fatigue, force, or activity may be monitored.

Figure 8:
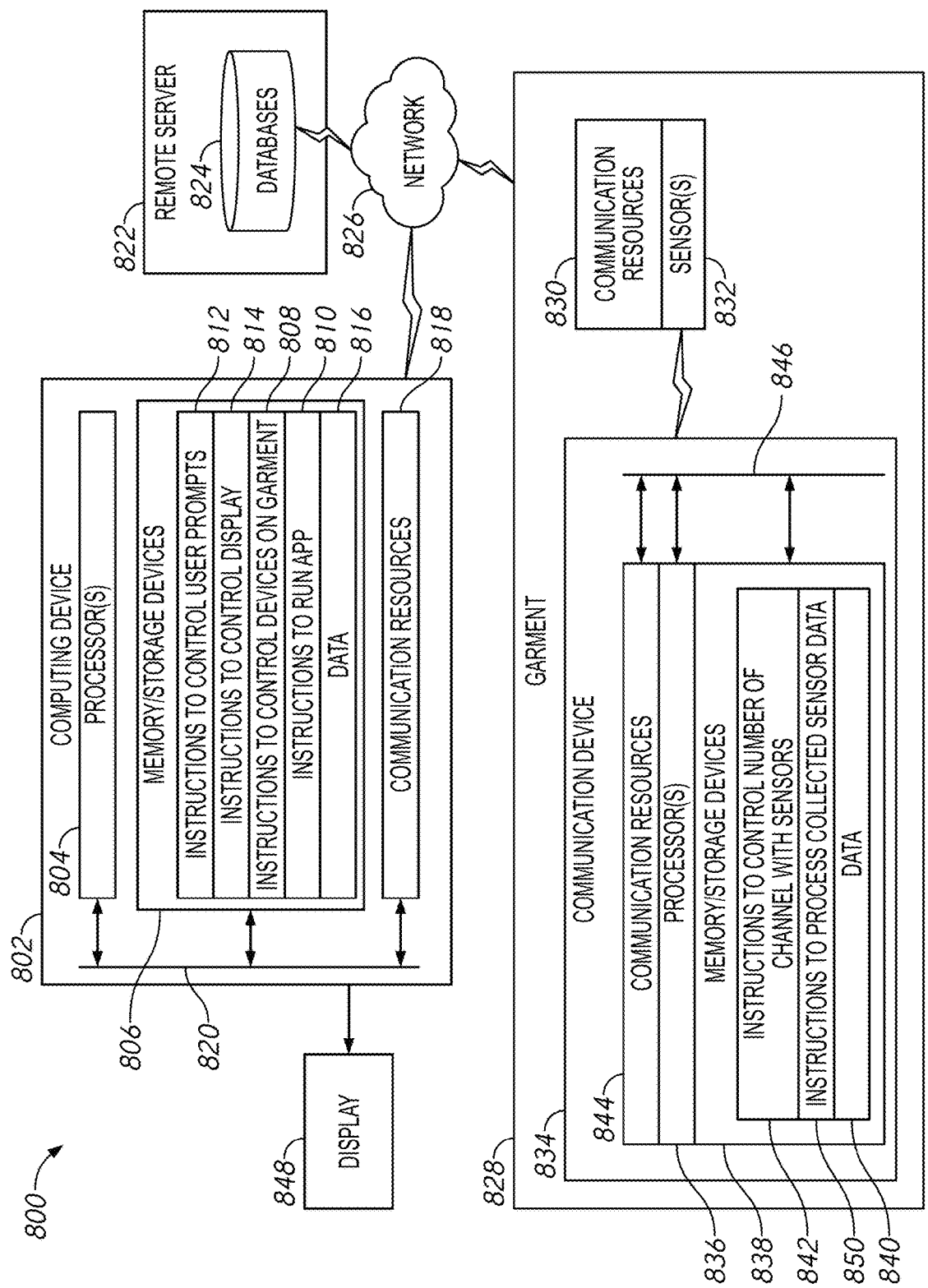
FIG. 8 is a block diagram of a system for monitoring sport-specific athletic performance in accordance with an embodiment of the present disclosure.

FIG. 8 is a block diagram of a system 800 for monitoring sport-specific athletic performance in accordance with an embodiment of the present disclosure. Specifically, FIG. 8 shows a diagrammatic representation of the system 800 including a computing device 802, a garment 828, and a communication device 834 that is to be attached to or positioned in proximity to the garment 828.

In some embodiments, the computing device 802 may be a portable device or a personal computer. In some examples, a portable device may be a smartwatch, smartphone, or portable media player. Such devices may include screens for viewing the processed biometric data, speakers or other audible output devices for sounding information about the processed biometric data, vibration devices, and/or other output devices for transmitting information related to the processed data. In some examples, a personal computer may be a laptop computer, a desktop computer, or a tablet. The computing device 802 may include one or more processor(s) 804 (or processor cores), one or more memory/storage devices 806, and one or more communication resources 818, each of which may be communicatively coupled via a bus 820.

The one or more processor(s) 804 may include, for example, a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), another processor, or any suitable combination thereof.

The memory/storage devices 806 may include main memory, disk storage, or any suitable combination thereof. The memory/storage devices 806 may include, but are not limited to, any type of volatile or non-volatile memory such as dynamic random-access memory (DRAM), static random-access memory (SRAM), erasable programmable read-only memory (EPROM), electrically erasable programmable read-only memory (EEPROM), Flash memory, solid-state storage, etc. The memory/storage devices 806 may store software, a program, an application, an applet, an app, or other executable code including instructions for causing at least any of processor(s) 804 to perform any one or more of the methods discussed herein. The instructions may include, for example, instructions to control devices on garment 808, instructions to run app 810, instructions to control user prompts 812, and instructions to control display 814. According to some example embodiments, the processor(s) 804 may be able to read instructions from a machine-readable or computer-readable medium (e.g., a non-transitory machine-readable storage medium), such as the memory/storage devices 806 and perform any one or more of the methods discussed herein, such as process 200 in FIG. 2. The instructions may reside, completely or partially, within the memory/storage devices 806, or any suitable combination thereof. The instructions may further reside, completely or partially, within at least one of processor(s) 804 (e.g., within the processor's cache memory). Furthermore, any portion of the instructions may be transferred to computing device 802 from any combination of databases 824 in a remote server 822 via a network 826. Accordingly, the memory of processor(s) 804, memory/storage devices 806 in the computing device 802, and/or databases 824 in the remote server 822 may be examples of computer-readable and machine-readable media.

The memory/storage devices 806 may also store data 816. The data 816 may include data to be processed by the processor(s) 804 and data resulting from the processing by the processor(s) 804, such as raw sensor data and/or performance data including muscle parameters, such as fatigue, force, and activities.

The one or more communication resources 818 may include interconnection or network interface components or other suitable devices to communicate with one or more communication device 834 attached to the garment 828 or one or more databases 824 in the remote server 822 via the network 826. For example, the communication resources 818 may include wired communication components (e.g., for coupling via a Universal Serial Bus (USB)), cellular communication components, NFC components, Bluetooth components (e.g., Bluetooth Low Energy), Wi-Fi components, and other communication components.

In some embodiments, the computing device 802 may be coupled to or may incorporate one or more displays 848. Responsive to execution of the instructions to control display 814 by the processor(s) 804, one or more displays 848 may provide graphical user interface, such as presentation of prompts and/or performance analysis results to the user.

The garment 828 may be any of the top or bottom garments described referring to FIGS. 1B and 3A-7B. The garment 828 may include compression materials. The garment 828 may include one or more sensor(s) 832 attached to or positioned in proximity to associated parts of the body of a user. In some examples, the sensor(s) 832 may include at least one or more heart rate sensors, such as EKG sensors that include electrodes to detect electrical signals that cause heart beats. In some examples, the sensors may include at least one or more muscle sensors, such as EMG sensors that include electrodes to measure muscle response or electrical activity in response to a nerve's stimulation of the muscle at each part of the body during physical activities specific to a type of sport and/or a role in the sport.

In some embodiments, the sensor(s) 832 may be equipped with communication resources 830, and may be coupled to the communication device 834, wirelessly (e.g., Bluetooth, NFC, Wi-Fi, etc.) and/or with one or more wires (e.g., traces) through the communication resources 830.

The garment 828 may include or may be attached to a communication device 834. The communication device 834 may include one or more processor(s) 836, one or more memory/storage devices 838, and one or more communication resources 844, each of which may be communicatively coupled via a bus 846.

The one or more processor(s) 836 may include, for example, a CPU, an RISC processor, a CISC processor, a GPU, a DSP such as a baseband processor, an ASIC, another processor, or any suitable combination thereof. In some embodiments, the processor(s) 836 may perform filtering functions to process raw electrical data from the sensors 832.

The memory/storage devices 838 may include main memory, disk storage, or any suitable combination thereof. The memory/storage devices 806 may include, but are not limited to, any type of volatile or non-volatile memory such as DRAM, SRAM, EPROM, EEPROM, Flash memory, solid-state storage, etc. The memory/storage devices 838 may store firmware, software, a program, or other executable code including instructions for causing at least any of processor(s) 836 to perform any one or more of the methods discussed herein. The instructions may include, for example, instructions to control the number of channels with sensors 842 and instructions to process collected sensor data 850. Responsive to sport-specific activities, the instructions to control the number of channels with sensors 842 may be executed to activate a corresponding number of channels coupled to the sensor(s) 832 to collect sensor data regarding substantial muscles in physical tasks based on the sport-specific activities. In some embodiments, the instructions to process collected sensor data 850 may include instructions to perform digital signal processing, such as filtering on raw electrical data from the sensors 832 that may be used to obtain performance data, including heart rate and muscle parameters, such as fatigue, force, and activities.

The memory/storage devices 838 may also store data 840. The data 840 may include data to be processed by the processor(s) 836 and data resulting from the processing by the processor(s) 836, such as raw sensor data.

According to some example embodiments, the processor(s) 836 may be able to read instructions from a machine-readable or computer-readable medium (e.g., a non-transitory machine-readable storage medium), such as the memory/storage devices 838 and perform any one or more blocks of the process 200 in FIG. 2. The instructions may reside, completely or partially, within the memory/storage devices 838, or any suitable combination thereof. The instructions may further reside, completely or partially, within at least one of processor(s) 836 (e.g., within the processor's cache memory). Furthermore, any portion of the instructions may be transferred from the databases 824 in the remote server 822 via the network 826. Accordingly, the memory/storage devices 838 in the communication device 834 and/or the databases 824 in the remote server 822 may be examples of computer-readable and machine-readable media.

The one or more communication resources 844 of the communication device 834 may include interconnection or network interface components or other suitable devices to communicate with one or more sensor(s) 832 and/or one or more databases 824 in the remote server 822 via the network 826. For example, the communication resources 844 may include wired communication components (e.g., for coupling via a USB), cellular communication components, NFC components, Bluetooth components (e.g., Bluetooth Low Energy), Wi-Fi components, and other communication components. The communication resources 844 may receive commands and instructions through the network 826, receive data from the sensor(s) 832, and provide the data through the network 826 to the remote server 822.

The system 800 may further include the remote server 822, which may be connected to the computing device 802 and the communication devices 834 via the network 826, such as the internet or an intranet. The remote server 822 may include one or more databases 824 that may store sensor data from one or more communication device 834 of one or more users and may provide the sensor data to one or more computing devices 802. In some embodiments, the remote server 822 may also include one or more processors that may perform the process 200. Processed data may be stored in the one or more databases 824. The remote server 822 may provide either the sensor data or the processed data to the computing device 802.

Figure 9:
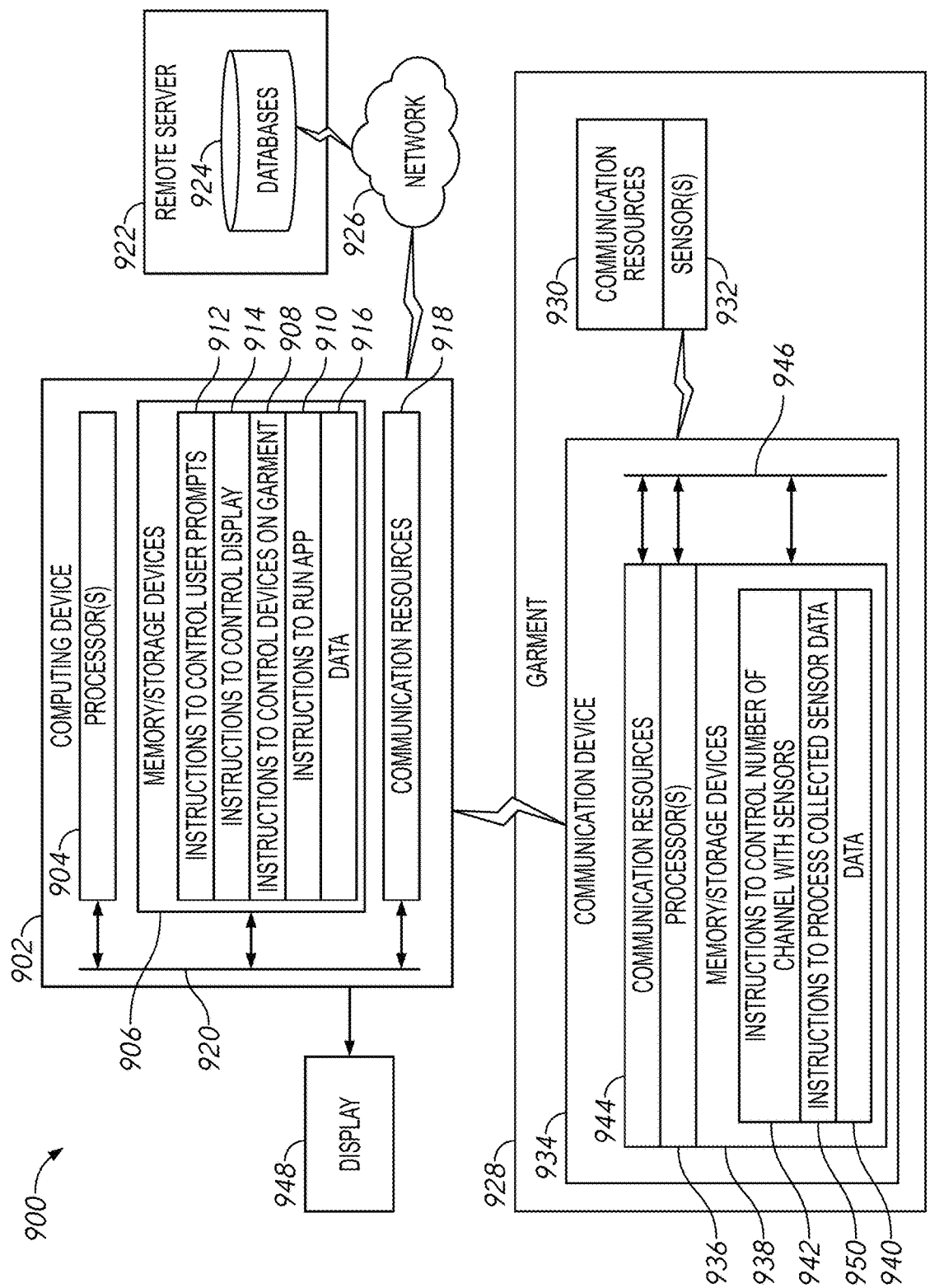
FIG. 9 is a block diagram of a system for monitoring sport-specific athletic performance in accordance with an embodiment of the present disclosure.

FIG. 9 is a block diagram of a system 900 for monitoring sport-specific athletic performance in accordance with an embodiment of the present disclosure. Specifically, FIG. 9 shows a diagrammatic representation of the system 900 including a computing device 902, a garment 928, and a communication device 934 that is to be attached to or positioned in proximity to the garment 928.

In some embodiments, the computing device 902 may be a portable device or a personal computer. In some examples, a portable device may be a smartwatch, smartphone, or portable media player. Such devices may include screens for viewing the processed biometric data, speakers or other audible output devices for sounding information about the processed biometric data, vibration devices, and/or other output devices for transmitting information related to the processed data. In some examples, a personal computer may be a laptop computer, a desktop computer, or a tablet. The computing device 902 may include one or more processor(s) 904 (or processor cores), one or more memory/storage devices 906, and one or more communication resources 918, each of which may be communicatively coupled via a bus 920.

The one or more processor(s) 904 may include, for example, a CPU, an RISC processor, a CISC processor, a GPU, a DSP such as a baseband processor, an ASIC, another processor, or any suitable combination thereof. The memory/storage devices 906 may include main memory, disk storage, or any suitable combination thereof. The memory/storage devices 906 may include, but are not limited to, any type of volatile or non-volatile memory such as DRAM, SRAM, EPROM, EEPROM, Flash memory, solid-state storage, etc. The memory/storage devices 906 may store software, a program, an application, an applet, an app, or other executable code including instructions for causing at least any of processor(s) 904 to perform any one or more of the methods discussed herein. The instructions may include, for example, instructions to control devices on garment 908, instructions to run app 910, instructions to control user prompts 912, and instructions to control display 914. According to some example embodiments, the processor(s) 904 may be able to read instructions from a machine-readable or computer-readable medium (e.g., a non-transitory machine-readable storage medium), such as the memory/storage devices 906 and perform any one or more of the methods discussed herein, such as process 200 in FIG. 2. The instructions may reside, completely or partially, within the memory/storage devices 906, or any suitable combination thereof. The instructions may further reside, completely or partially, within at least one of processor(s) 904 (e.g., within the processor's cache memory). Furthermore, any portion of the instructions may be transferred to computing device 902 from any combination of databases 924 in a remote server 922 via a network 926. Accordingly, the memory of processor(s) 904, memory/storage devices 906 in the computing device 902, and/or databases 924 in the remote server 922 may be examples of computer-readable and machine-readable media. The memory/storage devices 906 may also store data 916. The data 916 may include data to be processed by the processor(s) 904 and data resulting from the processing by the processor(s) 904, such as raw sensor data and/or performance data including muscle parameters, such as fatigue, force, and activities. The one or more communication resources 918 may include interconnection or network interface components or other suitable devices to communicate with one or more communication devices 934 attached to the garment 928 or one or more databases 924 in the remote server 922 via the network 926. For example, the communication resources 918 may include wired communication components (e.g., for coupling via a USB), cellular communication components, NFC components, Bluetooth components (e.g., Bluetooth Low Energy), Wi-Fi components, and other communication components. In some embodiments, the computing device 902 may be coupled to or may incorporate one or more displays 948. Responsive to execution of the instructions to control display 914 by the processor(s) 904, one or more displays 948 may provide graphical user interface, such as presentation of prompts and/or performance analysis results to the user. The garment 928 may be any of the top or bottom garments described referring to FIGS. 1B and 3A-7B. The garment 928 may include compression materials. The garment 928 may include one or more sensor(s) 932 attached to or positioned in proximity to associated parts of the body of a user. In some examples, the sensor(s) 932 may include at least one or more heart rate sensors, such as EKG sensors that include electrodes to detect electrical signals that cause heart beats. In some examples, the sensors may include at least one or more muscle sensors, such as EMG sensors that include electrodes to measure muscle response or electrical activity in response to a nerve's stimulation of the muscle at each part of the body during physical activities specific to a type of sport and/or a role in the sport. In some embodiments, the sensor(s) 932 may be equipped with communication resources 930, and may be coupled to the communication device 934, wirelessly (e.g., Bluetooth, NFC, Wi-Fi, etc.) and/or with one or more wires (e.g., traces) through the communication resources 930. The garment 928 may include or may be attached to a communication device 934. The communication device 934 may include one or more processor(s) 936, one or more memory/storage devices 938, and one or more communication resources 944, each of which may be communicatively coupled via a bus 946. The one or more processor(s) 936 may include, for example, a CPU, an RISC processor, a CISC processor, a GPU, a DSP such as a baseband processor, an ASIC, another processor, or any suitable combination thereof. In some embodiments, the processor(s) 936 may perform filtering functions to process raw electrical data from the sensors 932. The memory/storage devices 938 may include main memory, disk storage, or any suitable combination thereof. The memory/storage devices 906 may include, but are not limited to, any type of volatile or non-volatile memory such as DRAM, SRAM, EPROM, EEPROM, Flash memory, solid-state storage, etc. The memory/storage devices 938 may store firmware, software, a program, or other executable code including instructions for causing at least any of processor(s) 936 to perform any one or more of the methods discussed herein. The instructions may include, for example, instructions to control the number of channels with sensors 942 and instructions to process collected sensor data 950. Responsive to sport-specific activities, the instructions to control the number of channels with sensors 942 may be executed to activate corresponding number of channels coupled to the sensor(s) 932 to collect sensor data regarding substantial muscles in physical tasks based on the sport-specific activities. In some embodiments, the instructions to process collected sensor data 950 may include instructions to perform digital signal processing, such as filtering on raw electrical data from the sensors 932 that may be used to obtain performance data, including heart rate and muscle parameters, such as fatigue, force, and activities. The memory/storage devices 938 may also store data 940. The data 940 may include data to be processed by the processor(s) 936 and data resulted from the processing by the processor(s) 936, such as raw sensor data. According to some example embodiments, the processor(s) 936 may be able to read instructions from a machine-readable or computer-readable medium (e.g., a non-transitory machine-readable storage medium), such as the memory/storage devices 938 and perform any one or more blocks of the process 200 in FIG. 2. The instructions may reside, completely or partially, within the memory/storage devices 938, or any suitable combination thereof. The instructions may further reside, completely or partially, within at least one of processor(s) 936 (e.g., within the processor's cache memory). Furthermore, any portion of the instructions may be transferred from the computing device 902, or the databases 924 in the remote server 922 via the network 926 and the computing device 902. Accordingly, the memory/storage devices 938 in the communication device 934, the memory/storage devices 906 in the computing device 902, and/or the databases 924 in the remote server 922 may be examples of computer-readable and machine-readable media. The one or more communication resources 944 of the communication device 934 may include interconnection or network interface components or other suitable devices to communicate with one or more sensor(s) 932 and/or one or more databases 924 in the remote server 922 via the network 926. For example, the communication resources 944 may include wired communication components (e.g., for coupling via a USB), cellular communication components, NFC components, Bluetooth components (e.g., Bluetooth Low Energy), Wi-Fi components, and other communication components. The communication resources 944 may receive commands and instructions from the computing device 902, receive data from the sensor(s) 932, and provide the data to the computing device 902. The system 900 may further include the remote server 922, which may be connected to the computing device 902 via the network 926, such as the internet or an intranet. The remote server 922 may include one or more databases 924 that may store sensor data from the sensor(s) 932 or performance data processed by the computing device 902, and may provide the sensor data to one or more computing devices 902. In some embodiments, the remote server 922 may also include one or more processors that may perform the process 200. Processed data may be stored in the one or more databases 924. The remote server 922 may provide either the sensor data or the processed data to the computing device 902.

Figures 10, 11:
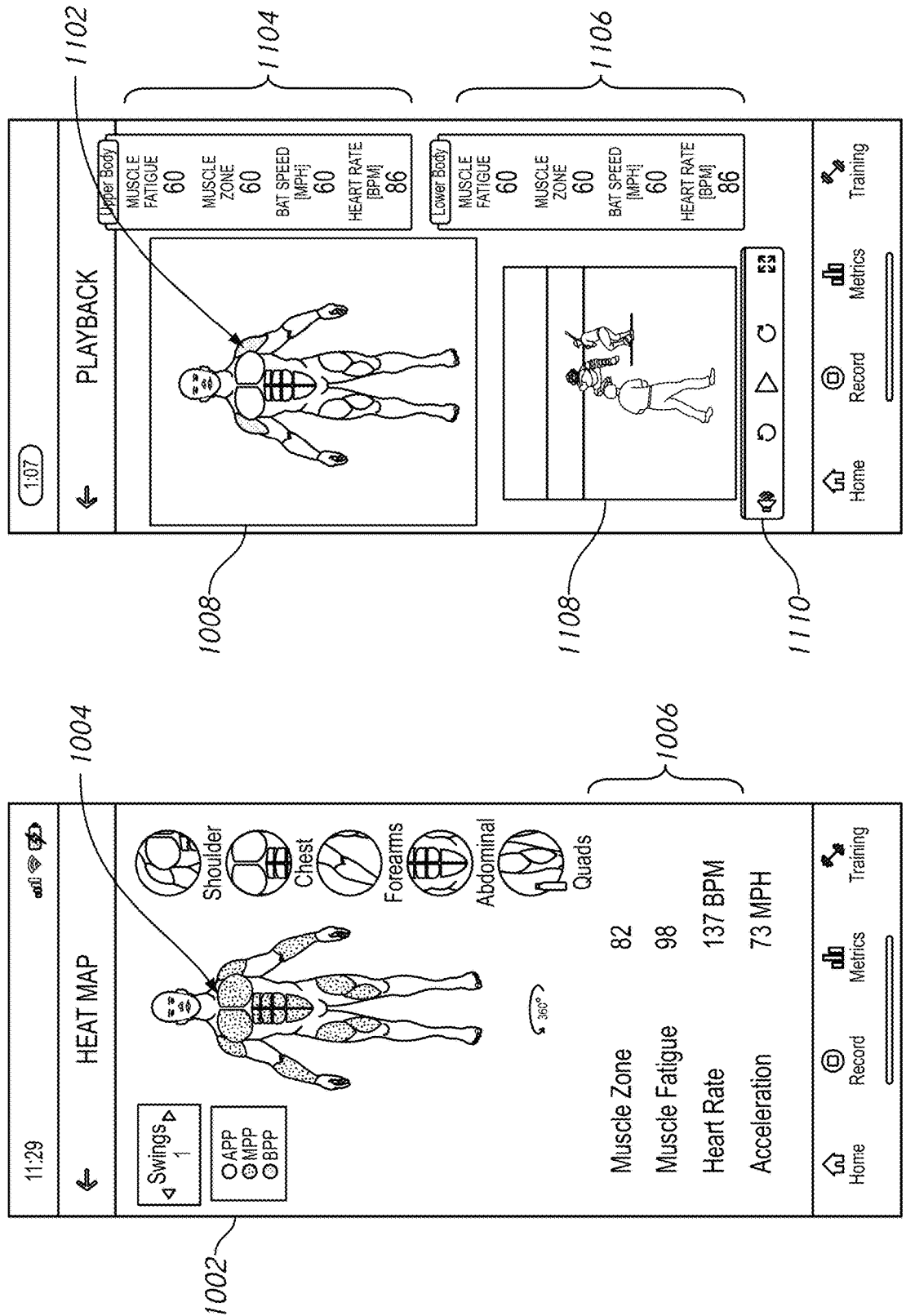
FIG. 10 is a screenshot showing a muscle heatmap in accordance with an embodiment of the present disclosure.
FIG. 11 is a screenshot showing a screen of video playback and a muscle heatmap associated with the video playback in accordance with an embodiment of the present disclosure.

FIGS. 10 and 11 are screenshots 1002 and 1008 showing anatomical views 1004 and 1102 in accordance with an embodiment of the present disclosure. The screenshots 1002 and 1008 include anatomical views 1004 and 1102, respectively, indicating avatars with heatmaps of muscle performance results in color coding at corresponding muscles. For example, muscles of shoulders, forearms, chest, core, and hamstrings are shown at "MPP" level in the anatomical view 1004, whereas muscles of shoulders are shown at "BPP" level in the anatomical view 1102. The screenshot 1002 also includes parameters 1006, such as muscle zone, muscle fatigue, heart rate, and acceleration in numbers. The parameters 1006 shown in the screenshot 1002 are merely examples, and other parameters related to physical performance may be included or some of the parameters 1006 may be omitted. The screenshot 1008 also includes upper body parameters 1104 and lower body parameters 1106, such as muscle zone, muscle fatigue, heart rate, and bat speed in numbers for upper and lower bodies separately, measured by top and bottom garments. The parameters 1104 and 1106 shown in the screenshot 1008 are merely examples, and other parameters related to physical performance may be included or some of the parameters 1104 and 1106 may be omitted. In some embodiments, the screenshot 1008 may further include video playback that is synchronized with the heatmap of the anatomical view 1102 in a time sequence. Thus, the performance results may be shown in the time sequence accompanied with a simultaneous video playback of the physical task/activity.

As set forth above, a system and method is provided for monitoring sport-specific athletic performance. The system provides for the communication of biometric data about an athlete from a communications device carried by the athlete to the internet, and optionally, from the internet to outside devices such as a computer, mobile phone, watch, etc. In at least one embodiment, the device may be removably attached to a compression shirt or other garment that is worn next to the skin. In order to provide this functionality, the communication device gathers data from sensors placed within a garment or shoe, and sends the data via a wireless telephony network such as CDMA, WiMax, GSM, etc. to the internet, where the data is collected on servers. The data is then processed on the servers to calculate data about an athlete's performance, improvement, history, training state, etc. Using this system, the athlete is automatically linked to the internet during a sporting event. This removes the need to process and store as much data on the athlete's body, as is done by current systems such as heart rate/watch combinations. The system allows real-time monitoring by trainers or scouts remotely, or in situ; monitoring by the athlete; or monitoring by any party (such as a sportscaster) who has been granted access to the athlete's device.

The ability to automatically send biometric data straight to the internet during a sporting event provides significant advantages. The disclosed system is flexible and can be used for an individual or by a team with no extra equipment beyond a computer that is equipped with an internet connection, and garments equipped with the device. Additional functionality can be accomplished by changing the software on the server, rather than upgrading hardware such as a watch. Because the athlete's performance data is stored on a server at all times, the athlete and/or trainers can monitor performance over long periods of time, and over multiple activities. Furthermore, the system provides for automatic cumulative tracking of an athlete during various sporting events and automated suggestions for improvements (e.g., automated training services available by viewing the processed data).

Although the present invention has been described with respect to certain preferred embodiments, it will be appreciated by those of skill in the art that other implementations and adaptations are possible. Moreover, there are advantages to individual advancements described herein that may be obtained without incorporating other aspects described above. Therefore, the spirit and scope of the appended claims should not be limited to the description of the preferred embodiments contained herein.

What is claimed is:

1. A method comprising:
activating a communication device in proximity to a garment and a plurality of sensors included in the garment at a plurality of locations corresponding to a plurality of parts of a body of a user, based on a type of the garment and sport-specific athletic activities based on the sport-specific information;
collecting data responsive to physical tasks of the user by the plurality of sensors;
providing the collected data from the plurality of sensors to the communication device;
transmitting the collected data by the communication device to a computing device;
processing the collected data based on the plurality of locations of the plurality of sensors;
analyzing performance of muscle contraction based on the processed data; and
causing a display to present athletic performance analysis results to the user,
wherein the results comprise an anatomical view of an avatar of the body of the user, the avatar overlaid with a heatmap representing the performance of muscle contraction, the heatmap including color coding at corresponding muscles,
and wherein the heatmap further comprises a mid-posterior plane (MPP) anatomical view of a first muscle, and a bi-posterior plane (BPP) anatomical view of a second muscle.

2. The method of claim 1, further comprising:
receiving one or more entries by the user selecting sport-specific information; and
identifying garment type based on the sport-specific information;
wherein activating the communication device and the plurality of sensors is executed based on the sport-specific information, and
wherein processing the collected data based on the plurality of locations of the plurality of sensors that are determined by the sport-specific information.

3. The method of claim 2, further comprising prompting the user to perform one or more physical tasks based on the sport-specific information.

4. The method of claim 2, wherein the sport-specific information comprises at least one of a type of sport and a role in the type of sport.

5. The method of claim 2, wherein the plurality of locations of the sensors in the garment are defined by a type of garment, associated with the sport-specific information.

6. The method of claim 5, comprising holding the plurality of sensors in proximity to the plurality of parts of the body associated with the sport-specific information by the garment.

7. The method of claim 1, wherein one or more parameters representing the performance of muscle contraction comprise at least one of fatigue, force, or activity.

8. The method of claim 7, wherein the plurality of sensors comprise at least one electromyography (EMG) sensor, and
wherein collecting data responsive to the physical tasks of the user comprises measuring at least one of fatigue, force, or activity by the at least one EMG sensor.

9. The method of claim 7, further comprising causing the display to present the avatar of the body of the user with color indication at one or more parts of the body associated with the performance of muscle contraction detected at the one or more parts.

10. The method of claim 1, further comprising causing the display to present a heart rate.

11. The method of claim 1, wherein collecting data responsive to the physical tasks of the user comprises measuring the heart rate.

12. A system comprising:
a garment;
a plurality of sensors attached to the garment at a plurality of locations corresponding to a plurality of parts of a body of a user, wherein the plurality of sensors are configured to provide sensor data responsive to physical activities of the corresponding plurality of parts of the body;
a communication device in proximity of the garment, the communication device configured to collect the data from the plurality of sensors and further configured to provide the data; and
a computing device comprising:
a memory device; and
one or more processors configured to:
cause the memory device to store the sensor data from the communication device;
process the sensor data based on a plurality of locations of the sensors;
analyze performance of muscle contraction based on the processed data; and
cause a display to present athletic performance analysis results to the user,
wherein the results comprise an anatomical view of an avatar of the body of the user, the avatar overlaid with a heatmap representing the performance of muscle contraction, the heatmap including color coding at corresponding muscles,
and wherein the heatmap further comprises a mid-posterior plane (MPP) anatomical view of a first muscle, and a bi-posterior plane (BPP) anatomical view of a second muscle.

13. The system of claim 12, wherein the one or more processors are further configured to receive sport-specific information entered by the user, and
wherein the sport-specific information comprises at least one of a type of sport and a role in the type of sport.

14. The system of claim 13, wherein the one or more processors are further configured to cause the display to present one or more prompts to the user to perform one or more physical tasks based on the sport-specific information.

15. The system of claim 13, wherein the plurality of locations of the sensors in the garment are defined by a type of garment associated with the sport-specific information.

16. The system of claim 13, wherein the garment comprises compression material configured to hold the plurality of sensors in proximity to the plurality of parts of the body associated with the sport-specific information.

17. The system of claim 12, wherein one or more parameters representing the performance of muscle contraction comprise at least one of fatigue, force, or activity.

18. The system of claim 17, wherein the plurality of sensors comprise at least one electrography (EMG) sensor configured to measure at least one of fatigue, force, or activity.

19. The system of claim 17, wherein the one or more processors are further configured to cause the display to present the avatar of the body of the user with color indication at one or more parts of the body associated with the performance of muscle contraction detected at the one or more parts.

20. The system of claim 12, wherein the plurality of sensors comprise at least one EKG sensor configured to measure heart rate, and
wherein the one or more processors are further configured to cause the display to present a heart rate.

* * * * *